Patented May 20, 1924.

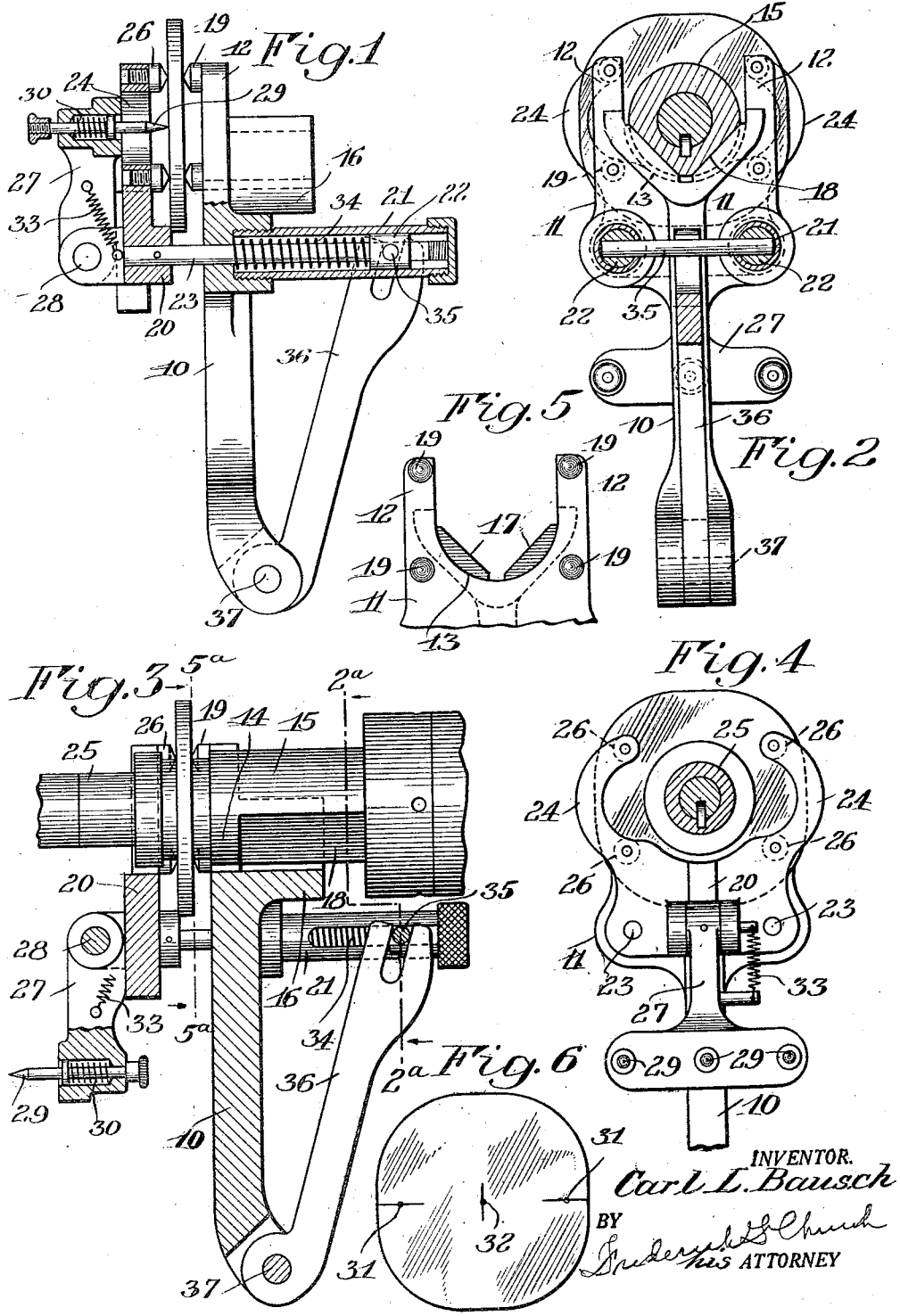

1,494,333

UNITED STATES PATENT OFFICE.

CARL L. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

LENS-GRINDING APPARATUS.

Original application filed September 17, 1921, Serial No. 501,397. Divided and this application filed March 21, 1923. Serial No. 626,544.

*To all whom it may concern:*

Be it known that I, CARL L. BAUSCH, of Rochester, in the county of Monroe and State of New York, have invented certain new and useful Improvements in Lens-Grinding Apparatus; and I do hereby declare the following to be a full, clear, and exact description of the same, reference being had to the accompanying drawing, forming a part of this specification, and to the reference numerals marked thereon.

This invention relates to lens grinding apparatus of the variety adapted for grinding the peripheral edges of eye glass and spectacle lenses to produce the desired shapes and sizes, the chief object of the invention being to provide a simple and efficient positioning device or clamp for gripping one or more lens blanks and locating the same in the blank holding means of the grinding machine with the blank optical center and axis accurately positioned with relation to the pattern or form of the machines. To these and other ends the invention resides in certain improvements and combinations of parts all as will be hereinafter more fully described, the novel features being pointed out in the claims at the end of the specification.

In the drawings:

Figure 1 is a side elevation partly in section of a lens positioning clamp embodying the present invention;

Figure 2 is a sectional view of the same on the line 2ª—2ª in Figure 3 showing the device applied to the holding means or spindle of the grinding machine.

Figure 3 is a view similar to Figure 1 showing the parts in different position and applied to the spindle of a grinding machine;

Figure 4 is an elevation of the clamp as seen from the left in Figure 3 with the grinding machine spindle in section.

Figure 5 is a fragmentary elevation of a portion of the clamp as viewed from the line 5ª—5ª in Figure 3;

Figure 6 illustrates a lens blank marked for cooperation with the positioning clamp.

Similar reference numerals throughout the several views indicate the same parts.

The present invention is particularly adapted for use with an edge grinding machine such for example as disclosed in my co-pending application for Letters Patent Serial No. 501,397, filed September 17, 1921, for lens grinding machines, of which the present application is a division. The invention in its present embodiment comprises, preferably, a clamping member, 10, having a plate-like enlargement 11 at one end forked to provide spaced arms 12 the inner sides of which are connected by a circular contact portion or surface 13, Figure 5, adapted to fit the cylindrical extremity 14 of a blank holding spindle 15 of a grinding machine. Member 10 is formed also with a lateral extension 16 the upper side of which comprises flat contact surfaces 17 arranged at an angle with each other, as shown in Figure 5. Lens spindle 15 is formed adjacent its cylindrical end portion 14 with flat surfaces 18 arranged at the same angle with each other as the clamp surfaces 17, it being apparent that clamp member 10 may be applied to the spindle end as shown in Figures 2 and 3 with its surfaces 13 and 17 in engagement with the spindle surfaces 14 and 18 respectively, and that by this means the lens gripped by the clamp and positioned thereon as hereafter described may be accurately located on the spindle of the grinding machine. Portion 11 of clamp member 10 carries on one side of its forked end a plurality of gripping knobs 19 of any suitable material for effectively gripping and holding the lens surface.

An opposing clamp member 20 is movably carried on member 10 by means comprising, preferably, a pair of tubular supports 21 spaced from each other on opposite margins of member 10. Sliding in each tube is an enlarged portion 22 of a rod 23 sliding also in a guide bearing in member 10 and having the opposing clamp member 20 fixed on its outer end. Rods 23 are moved to carry member 20 toward and from member 10 to grip and release a lens blank by means described below. Member 20 has at its upper end forked arms 24 preferably curved outwardly and spaced apart to clear the other spindle 25 of the grinding machine. Arms 24 are provided with lens engaging knobs 26 similar to the knobs of member 10, it being apparent that a lens blank properly located between the clamp members in the manner hereafter described may be gripped by the latter and applied as already described to the holding spindles of the grinding machine.

The means for positioning the blank between the clamp members comprises preferably a part 27 pivotally supported at 28 adjacent the bottom of member 20 and carrying at its outer end a plurality of contact points 29 preferably yieldably supported on part 27 by the spring device 30, as shown in Figure 3. These points, of which there are in the present instance 3, are located in alignment with each other for registry and engagement with marks 31 and 32 placed on the lens blank, as shown in Figure 6, to indicate the optical axis and center respectively, of the blank. When the latter is placed between the separated gripping members of the clamp and gripped thereby, part 27 is moved to the position shown in Figure 1 and the blank adjusted to bring the described marks into registry with the contact points 29. With the lens thus accurately located in the clamp, part 27 may be swung to inoperative position at one side, as shown in Figure 3, so as to clear spindle 25, when the clamp is ready for application to the lens holding spindle of the grinding machine to position the blank thereon, it being understood of course that one of such spindles is longitudinally movable to separate them while the blank is being inserted or removed. A spring 33 is provided for holding part 27 in its different positions, being arranged to pass over the pivotal center 28 of part 27 as shown to retain the latter in either position to which it is moved. It is apparent that after one lens blank has been located as described on clamp member 10, one or more additional blanks may be successively located against the first in the manner described, as well understood in the art.

The means for moving clamping members 10 and 20 toward and from each other comprises, preferably, a spring 34 coiled about each rod 23 in its tubular support 21 and bearing against clamp member 10 at one end and at the other against the enlargement 22 of the rod to resiliently press the clamping members toward each other to grip the blank. Rods 23 are connected by a transverse pin 35 engaged by the forked upper end of an arm 36 pivoted at 37 on the lower end of clamp member 10. Members 10 and 36 thus form a convenient handle portion for the device or clamp and by pressing these parts toward each other, the clamp may be conveniently opened and held in such position while adjusting a blank.

In operation clamp member 10 and arm 36 are grasped in one hand and pressed together thereby separating members 10 and 20. A blank is inserted between and gripped by the knobs 19 and 26 of these members and part 27 swung to the position shown in Figure 1. The blank is then adjusted to locate its markings 31 and 32 in registry with the contact points 29, the center one of which cooperating with the blank mark 32 positions the blank concentrically of the clamp with respect to its optical center. The outer contact points 29, when coinciding with the outer blank marks 31 of the optical axis, accurately locate the blank in this respect also relative to the clamp. With the blank thus precisely located in the clamp, part 27 is swung downwardly to the out-of-the-way position shown in Figure 3 and the clamp is applied to the lens holding spindle of the grinding machine with its contact portions or surfaces 13 and 17 in engagement with the corresponding surfaces 14 and 18, respectively, of the blank holding spindle. This obviously locates the clamp accurately with reference to the machine spindle so that the blank optical center and axis are precisely located with reference to the usual pattern or form controlling the edge grinding operation as well understood in the art. When the abutting ends of the holding spindles of the grinding machine have been brought into gripping relation with one or more blanks so located in the machine, the clamp is manipulated to separate its gripping members, after which it may be withdrawn.

As apparent from the above description and the drawings the construction is exceedingly simple, practical and efficient and of such a nature as to insure a high degree of precision in positioning the blank by reason, among the other advantageous features described, of the provision of contact points for actual engagement with the markings of the blank to position the latter without reliance upon purely visual or sighting adjustments between the blank and indices or markings of the clamp, as frequently necessary in some prior devices. It is apparent also that the present clamp is not only accurate in operation but convenient and expeditious in use as well.

I claim as my invention:

1. A clamp for positioning a lens in a lens edge grinding machine comprising relatively movable members for gripping a lens blank and a device movably carried by one of said members having contact points for cooperation with marked portions of the blank to position the latter between said members.

2. A clamp for positioning a lens in a lens edge grinding machine comprising relatively movable members for gripping a lens blank and a device on one of said members provided with a part for cooperation with the lens to locate the same between said members and movable to operative position and to an inoperative position spaced from the lens.

3. A clamp for positioning a lens in a lens edge grinding machine comprising relatively movable members for gripping a lens blank from opposite sides thereof, said clamp being provided with contact portions for engagement with corresponding portions on said grinding machine to locate the clamp concentrically and at the desired angle of rotation relative to the latter, and a device movably carried by one of said clamp members having contact points for cooperation with marked portions of a blank to position the latter concentrically and at the desired angle of rotation relative to said clamp.

4. A clamp for positioning a lens in a lens edge grinding machine comprising relatively movable members for gripping a lens blank from opposite sides thereof, said clamp being provided with contact portions for engagement with corresponding portions on said grinding machine to locate the clamp concentrically and at the desired angle of rotation relative to the latter, and a device movably carried by one of said clamp members having a contact point for cooperation with a center mark of a lens and also a contact point for cooperation with a mark representing an axis of said lens to locate the latter concentrically relative to the clamp and at a desired angle of rotation.

5. A clamp for positioning a lens in a lens edge grinding machine comprising a pair of relatively movable members for gripping opposite sides of a lens blank, resilient means normally urging said members into gripping relation, and a device on one of said members provided with a contact point for cooperation with the lens to locate the same between said members and movable to operative position and to an inoperative position spaced from the lens.

6. A clamp for positioning a lens in a lens edge grinding machine comprising relatively movable members for gripping a lens blank from opposite sides thereof, said clamp being provided with contact portions for engagement with corresponding portions on said grinding machine to locate the clamp concentrically and at the desired angle of rotation relative to the latter, and a device carried by one of said clamp members for movement thereon to and from operative position having a plurality of contact points for cooperation with respective markings of a lens to locate the latter concentrically and at the desired angle of rotation relative to said clamp.

7. A clamp for positioning a lens in a lens edge grinding machine comprising a pair of relatively movable members having substantially U-shaped portions for gripping the edges of a lens from opposite sides, resilient means normally urging said members into gripping relation, and a device pivoted on one of said members having contact points for engaging and locating a lens between said members and movable to lens engaging position and also to a position spaced from the lens.

CARL L. BAUSCH.